United States Patent [19]
Hubka et al.

[11] 3,823,659
[45] July 16, 1974

[54] APPARATUS FOR PREPARING A NON-PACKAGED EGG PRODUCT

[75] Inventors: Vladimir Hubka, Winterthur, Switzerland; Henning Rehhoff, Greve Strand; Mogens Myrup Andreasen, Copenhagen, both of Denmark

[73] Assignee: Instituttet for Produktudvikling, Lyngby, Denmark

[22] Filed: Oct. 19, 1972

[21] Appl. No.: 298,912

Related U.S. Application Data
[63] Continuation-in-part of Ser. No. 160,634, July 8, 1971, abandoned.

[30] Foreign Application Priority Data
July 15, 1970  Netherlands.......................... 703670

[52] U.S. Cl....................... 99/353, 99/427, 99/441
[51] Int. Cl............................................... A47j 43/20
[58] Field of Search............. 99/353, 243, 327, 426, 99/428, 430, 441, 101, 175, 177; 249/92, 160, 173

[56] References Cited
UNITED STATES PATENTS

| | | | |
|---|---|---|---|
| 2,746,402 | 5/1956 | Baxter................................ | 249/160 |
| 2,974,385 | 3/1961 | Leisenring.......................... | 249/160 |
| 3,285,749 | 11/1966 | Shires.................................... | 99/428 |
| 3,289,570 | 12/1966 | Smith.................................... | 99/441 |
| 3,374,728 | 3/1968 | Owens................................. | 99/353 |
| 3,385,712 | 5/1968 | Dodge et al. ........................ | 99/177 |
| 3,454,257 | 7/1969 | Du Puis............................... | 249/173 |
| 3,505,948 | 4/1970 | Carre................................... | 99/353 |
| 3,537,385 | 11/1970 | Puschner............................. | 99/353 |
| 3,615,716 | 10/1971 | Poulus................................. | 99/177 |

*Primary Examiner*—Robert W. Jenkins
*Attorney, Agent, or Firm*—Sughrue, Rothwell, Mion, Zinn & Macpeak

[57] ABSTRACT

An apparatus for preparing a non-packaged egg product comprising a cylindrical core of coagulated yolk mass surrounded by a shell of coagulated egg white mass. The apparatus comprises a heating chamber and preferably also a cooling chamber located below the heating chamber and mechanically connected thereto. Longitudinally slitted molds of a resilient sheet material are closed around a bottom member thereof and introduced in tubes traversing the heating chamber. A separator tube is inserted in each mold whereupon yolk and egg white mass are supplied to the two compartments of the mold internally and externally of the separator tube, respectively. After a preliminary coagulation the separator tube is withdrawn and after final coagulation the mold is transferred to the cooling chamber and later ejected therefrom, whereby the resilient mold opens and releases the finished egg product. Means may be provided for cleaning the separator tube externally and internally during the withdrawal thereof from the mold. In an alternate arrangement the egg white is first injected into the space between the mold and separator tube and allowed to partially coagulate. The separator tube is then withdrawn and the egg yolk is thereafter injected into the central cavity defined by the egg white.

15 Claims, 11 Drawing Figures

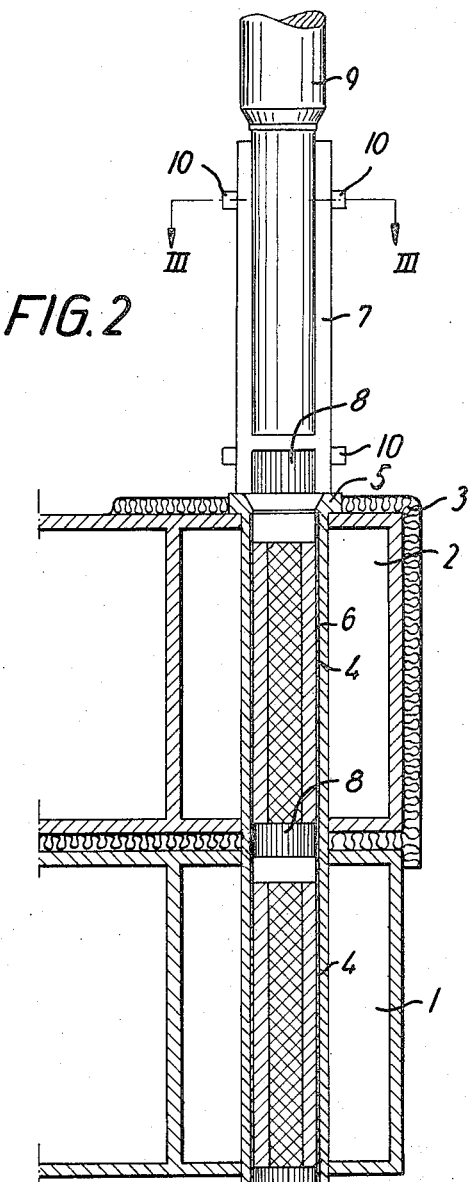
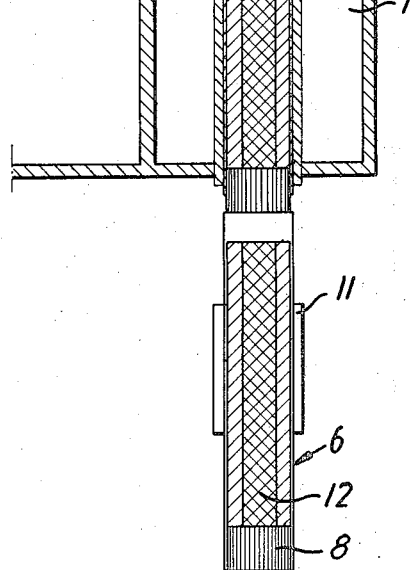
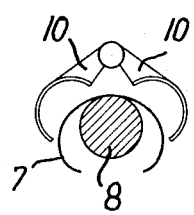
FIG. 2
FIG. 3

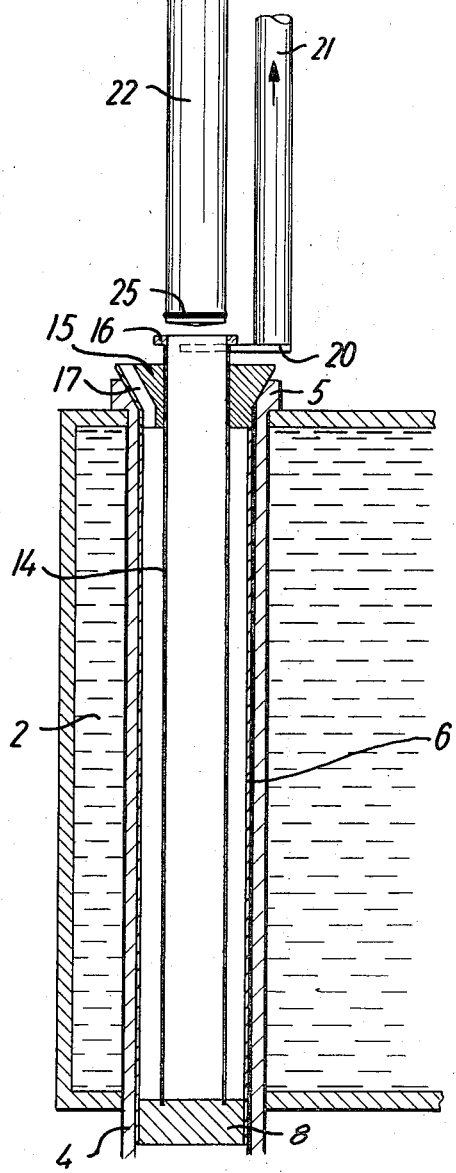

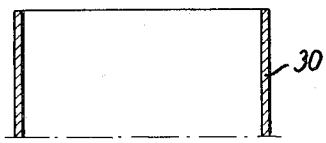
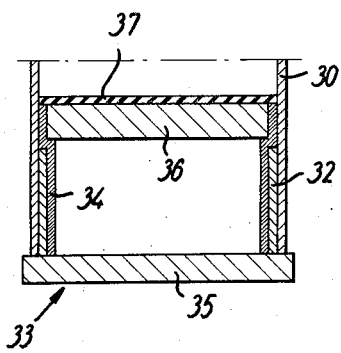
FIG. 8
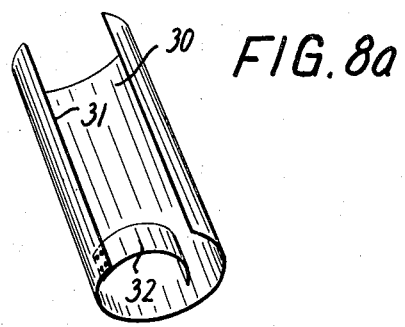
FIG. 8a

APPARATUS FOR PREPARING A NON-PACKAGED EGG PRODUCT

This application is a continuation-in-part of U.S. Pat. application No. 160,634, filed July 8, 1971, now abandoned.

BACKGROUND OF THE INVENTION

This invention relates to an apparatus for preparing a non-packaged egg product comprising a cylindrical core of coagulated yolk mass surrounded by a shell of coagulated egg-white mass.

When reference is made, in this context, to a yolk and an egg-white mass, these terms are to be understood to include not merely yolk or egg-white as such, but also yolk and egg-white mixed with one or more additives, which may be colouring agents, flavouring additives or preservatives which are by and large homogeneously distributed in the mass, or rather inhomogeneously distributed additions, e.g. minced meat, vegatables, etc. The egg product dealt with will normally be circular-cylindrical, but may have a different cross-sectional shape with a smoothly curved, convex outline, including oval.

From U.S. Pat. No. 2,421,199, an apparatus for the production of a cylindrical egg product consisting of yolk and a surrounding shell of egg-white is known. The product is prepared in a cylindrical container which, subsequent to coagulation of the product, is hermetically sealed. Since each container thus is used only once, the product becomes relatively expensive and the method of preparation is less expedient when a distinctly elongated product is desired that has a relatively small cross-sectional area corresponding to the slices obtained by cutting up a hard-boiled egg. Also, opening the container and removing the product is difficult and involves a great risk of damaging its surface, primarily due to adhesion between the surface and the inner container wall.

It is also known to prepare egg products of the kind dealt with in a tubular casing that subsequently may be severed transversely to form individual packages. However, when using this technique, it is necessary to first coagulate the yolk completely and then place it centrally in the casing, whereupon the egg-white mass is poured in and coagulated. Hereby the production process becomes complicated and the adherence between the yolk and the egg-white can fail after the product has been cut into slices.

SUMMARY OF THE INVENTION

According to the present invention there is provided an apparatus for preparing a non-packaged egg product comprising a cylindrical core of coagulated yolk mass surrounded by a shell of coagulated egg-white mass, comprising a heating vessel, means for circulating a heating fluid through said heating vessel, a plurality of elongated, thin-walled moulds of resilient, yet rigid sheet material, each mould having at least one longitudinal slit and being open at one end, a bottom member located at the opposite end of each mould, means for closing each mould around its bottom member by a radial constriction of the mould, means for successively introducing said moulds in said heating vessel, means in said vessel for maintaining the moulds closed after their insertion in the vessel, means for inserting and centering a separator tube coaxially with and spaced from the inner wall of each mould when inserted in the vessel, means for supplying liquid yolk and and egg-white, respectively, to the interior of said separator tube and to the space between the separator tube and the inner wall of the mould, means for retracting said separator tube after a preliminary coagulation of the yolk and egg-white, and means for withdrawing said moulds from said heating vessel whereby said moulds open by radial expansion due to their resiliency so that the finished product may be removed therefrom.

An apparatus according to the invention is well-suited for preparing cylindrical egg products on an industrial scale. The employment of the separator tubes, which are known per se, and which are removed after a preliminary coagulation of the yolk and egg-white, renders it possible to effect the coagulation simultaneously and thus achieve a good adherence between yolk and egg-white. The use of radially resilient moulds effectively solves the difficult problem of preventing adhesion between the mould wall and the surface of the product when removing the product from the moulds, since the relative movement between the surface of the product and the mould wall takes place essentially radially over the entire area of the contact surface, that is to say, that practically no sliding or slippage occurs between the product and the mould. As experience has shown, such a slippage may give rise to damage of the product surface, particularly if small amounts of coagulated egg-white stick to the mould wall. With resilient moulds it is possible to let the egg-white coagulate directly in contact with the mould wall and, in this manner, to achieve a more effective heat transfer and, thereby, a more rapid coagulation than would be possible if the inner mould wall were to be lined with a packing foil prior to the filling of the mould. The individual steps of the process are also simplified because the external wrapping is applied only after the product has been removed from the mould. An automation of the functions can be effected with a relatively simple apparatus and the packing into an external foil can be effected with existing and dependable machines, e.g. a vacuum packing machine of the type employed for packing sausages.

Each mould may comprise two substantially semi-cylindrical shells each of which, at the bottom end of the mould, is secured to one of two mutually rotatable bottom members. By turning the two mould shells by about 180° relative to each other after the product has been loosened from the mould due to the radial resiliency of the shells, a gap of such a width is formed that the product can be removed radially from the mould when this is turned so that the gap is downwardly directed. The same advantageous effect may be achieved by making each mould with a single web, the two parallel longitudinal edges of which form a longitudinal slit which, in the normal or relaxed, open position of the mould, is at least equally as wide as the internal diameter of the mould when the slit is completely closed. This embodiment calls for a highly resilient mould material but is, on the other hand, structurally simpler than the first mentioned.

The bottom member of each mould may be detachably connected with the web by means of a resilient tab or tongue which is secured to the web at one longitudinal edge of the slit and extends at least partially over the slit in the open position of the mould. The use of a removable bottom member facilitates the cleaning of the mould and when the bottom member is located at one edge of the slit, the finally coagulated egg product detaches itself from the mould bottom very easily.

The heating vessel may be constructed in the form of a closed chamber having a top and a bottom wall with opposing and aligned apertures arranged in pairs and connected by means of cylindrical wall members surrounding the apertures for enclosing the closed moulds introduced in the chamber. The tightness of the radially constrained mould is thus effectively ensured since the vertical ducts formed by the cylindrical wall members prevent egg-white from leaking out of the mould or the heating medium from penetrating into the mould. The introduction and removal of the moulds can take place through the opposite ends of the open ducts, which simplifies the construction of the apparatus and renders possible a continuous operation, in that a mould, in which an egg product has been finally coagulated, can be ejected from the duct by introducing an empty mould into the opposite end of the duct. For the purpose of introducing the empty mould, a vertically displaceable mandrel having a diameter corresponding to the internal diameter of the closed mould may be provided to cooperate with at least one pair of tongs that can be closed around the mould.

Below the heating chamber and connected thereto, there may be provided a cooling chamber of similar construction and having apertures in its top wall coaxially aligned with the apertures in the bottom wall of the heating chamber. The cooling of the egg products prior to their removal from the mold renders them more convenient for manual handling and has, moreover, the advantage that they contract slightly so that they detach more easily from the mold.

For introducing and centering the separator tube there may be provided a pusher member which is displaceable in the longitudinal direction of the mold and adapted to engage with a flange on the outer end of the tube and an axially immovable mandrel located coaxially with the closed mold whereby the tube may slide along the mandrel. An annular groove may be provided in the bottom member of the mold for receiving the inner or lower end of the separator tube.

A plug-like guide piece that fits with the open end of the mold and which has a longitudinal duct for the supply of egg white mass may be slidingly displaceable along the outside of the separator tube between the flange and a stop located at the opposite end of the tube. The said guide piece may, besides serving to conduct the egg white into the mold, be utilized for scraping the outer surface of the separator tube clean when the tube is withdrawn, while the guide piece remains in the mold until the stop at the lower end of the tube carries it along.

A corresponding cleaning operation of the inner surface of the separator tube after each operation may be effected if the free or lower end of the mandrel carries a scraper member for engaging with the inside of the separating tube. A rubber ring fitted into a groove in the mandrel can be used as the scraper member.

In an alternate embodiment the egg white is first injected into the space between the mold and separator tube and allowed to partially coagulate. The separator tube is then withdrawn and the egg yolk is thereafter injected into the central cavity defined by the egg white.

BRIEF DESCRIPTION OF THE DRAWINGS

The invention will now be described in more detail with reference to the somewhat schematical, accompanying drawings, in which FIG. 2 shows a vertical section along line II—II of FIG. 1 on a larger scale illustrating the station in the machine where the molds are introduced and removed, FIG. 3 shows a horizontal section along line III—III of FIG. 2, FIG. 4 shows a section along line IV—IV of FIG. 1 on a larger scale than FIG. 2 and illustrates the station where a separator tube is raised following partial coagulation of yolk and egg white, FIG. 5 shows a corresponding section along line V—V of FIG. 1, showing, however, only the means for introducing the separator tube, FIG. 5a shows the section framed with a circle in FIG. 5, but on a larger scale, FIG. 6 shows a perspective view on a smaller scale of a resilient mold for use in the machine, FIG. 8 shows a longitudinal section through an embodiment that is modified in relation to FIG. 6, of a resilient mold shown in the closed position, and FIG. 8a shows a perspective view of the mold illustrated in FIG. 8 with the bottom portion removed.

DETAILED DESCRIPTION

Figure 1:
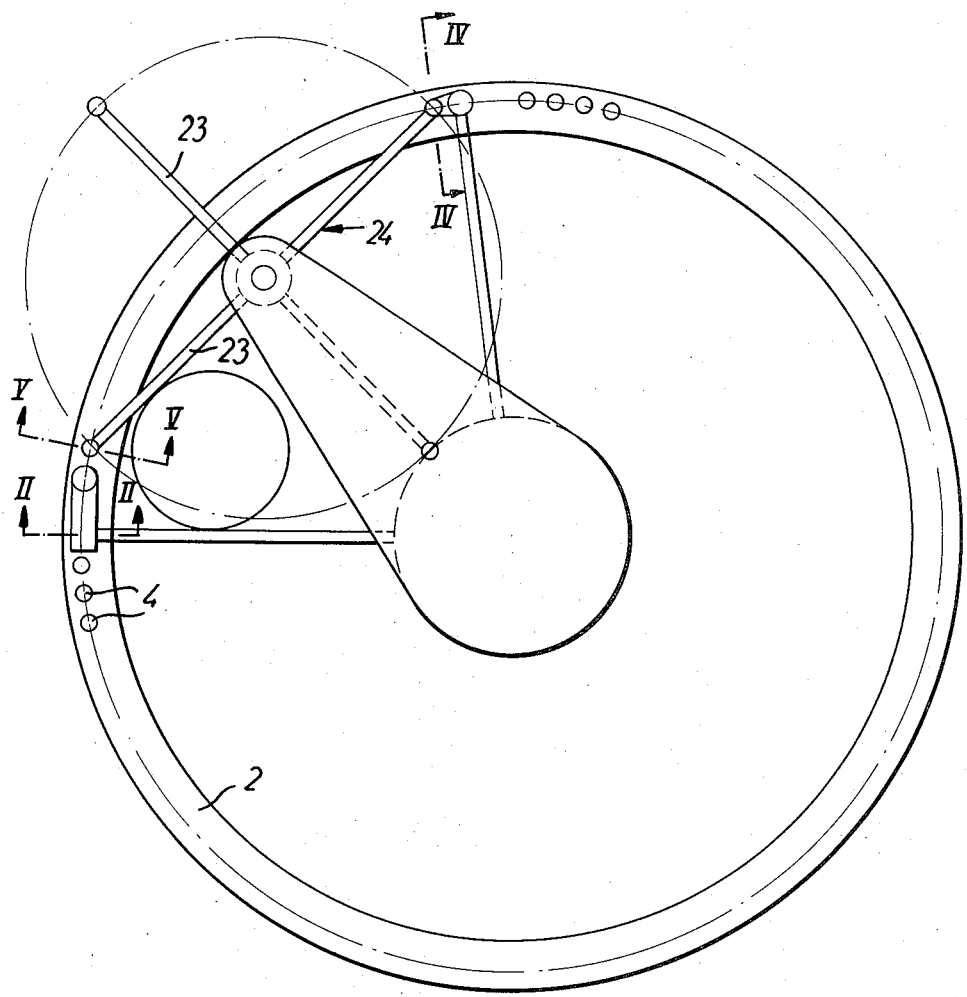
FIG. 1 shows a plan view of an embodiment of the apparatus according to the invention in the form of a so-called circular machine.

The machine illustrated in FIGS. 1–7 has a frame that has not been shown in greater detail and which carries a cooling vessel in the form of an annular chamber 1 and a heating vessel formed as an annular heating chamber 2 of corresponding radial dimensions located above the cooling chamber. At least the outwards-facing surfaces of chamber 2 may be enclosed by an insulating material 3 which is only seen in FIG. 2, which also shows that the insulating material may expediently extend between the two chambers. In the horizontal upper and lower faces of chambers 1 and 2, there are provided a rather large number of coaxially aligned bores arranged in pairs, and tubes 4 each provided with a flange 5 on the top side of heating chamber 2 are secured in the bores so as to extend down through both chambers and terminate below the bottom of cooling chamber 1. Tubes 4 are secured leakproof in the walls of the chambers. Furthermore, the two chambers are provided with inlets and outlets (not shown) for a cooling and a heating medium, respectively, the temperatures of which can be thermostatically controlled.

A plurality of removable moulds 6 is used for preparing the cylindrical egg products referred to above. As shown in perspective view in FIG. 6, each mould consists of a web 7 of highly resilient sheet metal, e.g. stainless steel sheet which, in a suitable manner, for instance, by rolling, has been shaped into a cylinder which is slitted in its longitudinal direction, and of a bottom member 8 secured to one end of web 7. As shown in FIG. 6, the bottom member 8 may be a circular-cylindrical block of rubber or similar material which is glued to the web and has an outline corresponding to the desired outline of the finished egg product. In its normal, relaxed state, web 7 has the shape shown in FIG. 6, that is to say that the gap between its two longitudinal edges is of the same order of magnitude as the diameter of bottom member 8. When web 7, as is described in greater detail below, is closed around bottom member 8, the said two edges are, practically speaking, in abutment and the external diameter of the web then is of such a size that it fits into the tube 4 mentioned above, which passes through chambers 1 and 2.

Figure 7:
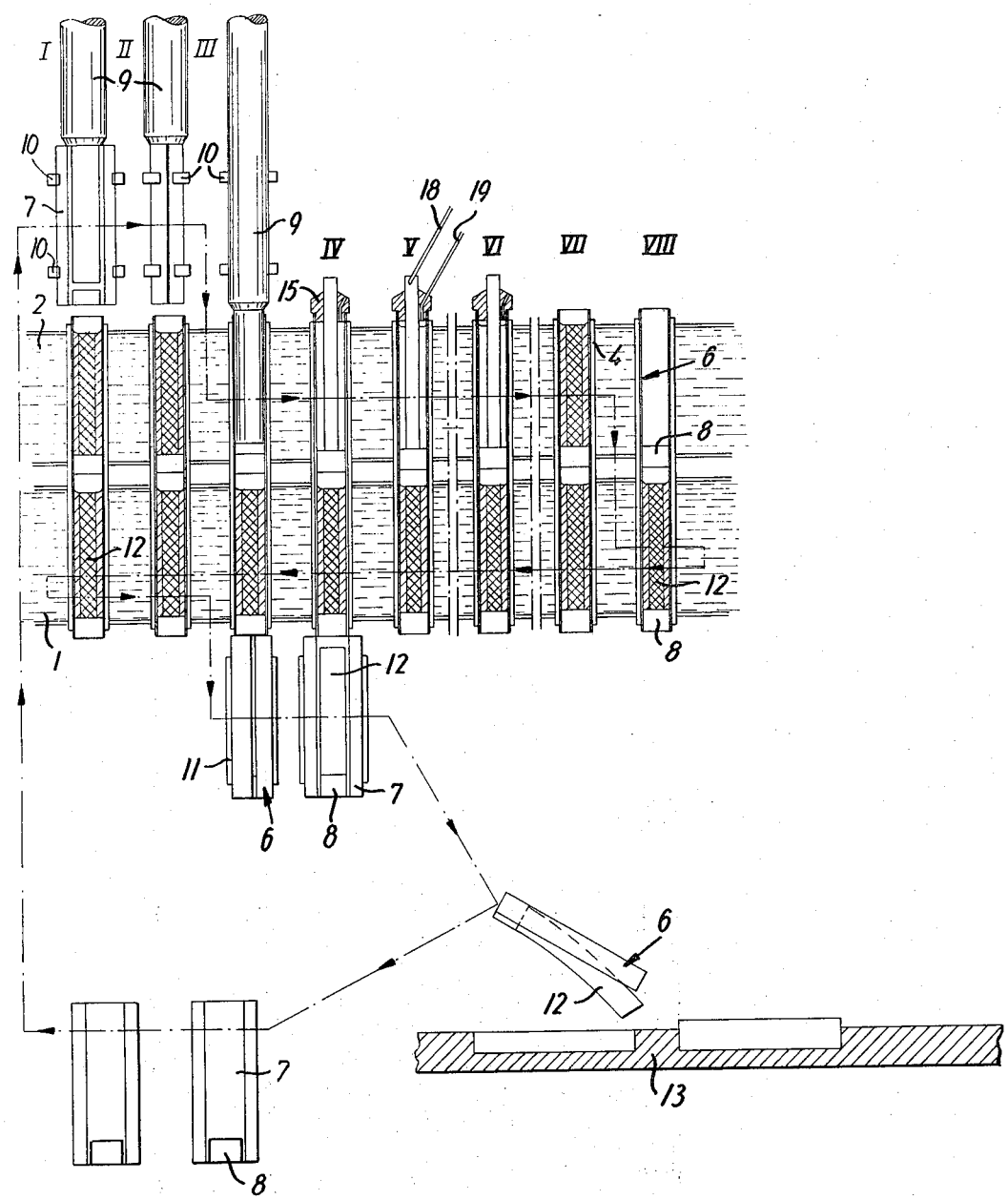
FIG. 7 shows a diagram for illustrating the operation of the machine.

When the machine is operating, the mechanically connected chambers 1 and 2 revolve intermittently around their vertical centre line, and the length of each displacement step is equal to the angular spacing between the centre lines of two successive tubes 4. In that station along the periphery of the machine, which is shown in FIG. 2 a mould 6 is introduced into the top end of the tube 4 following each incremental rotation of the machine, and at the same time a filled mould containing a coagulated egg product is removed from the bottom of the same tube 4. An operator places the open mould 6 in contact with a mandrel 9, the diameter of which corresponds to the diameter of bottom member 8, whereupon two pairs of tongs, each comprising two mutually pivotable jaws 10, close around web 7 of the mould, after which the mandrel 9 is moved downwards to introduce the closed mould into the topmost end of tube 4. This procedure is also illustrated in FIG. 7, which shows three consecutive positions I, II and III of the mould-closing and mould-introducing tools. It is remarked that the three operations corresponding to positions I, II and III all are performed in the same station, viz. that shown in FIG. 2.

Concurrently with the introduction of the empty mould into the upper part of tube 4 surrounded by the heating chamber, a mould 6 present in this part of the tube and containing a coagulated egg product, is pushed down into the lower part of tube 4 surrounded by the cooling chamber, and a mould present in this part of the tube is pushed out of the tube and into a schematically shown holding tool 11, which may have two jaws similar to jaws 10 and a mechanicm for the controlled movement of the jaws away from each other, whereby the mould, due to its resiliency, opens. After this, the mould can be taken over by an operator who turns it in such a way that the open slit between the longitudinal edges of web 7 comes to face downwards, whereupon the egg product, designated by 12 in FIG. 7, can be manually removed from the mould and placed in a diagrammatically shown packing machine 13, e.g. a well-known vacuum packing machine which places and wraps a sheet of foil (not shown) around the egg product.

Immediately after the mould has been introduced into the heating chamber, there follows in position IV, FIG. 7, the insertion of a so-called separator tube 14, see also FIGS. 4 and 5. Tube 14, the diameter of which corresponds to the diameter of the yolk core in the finished egg product, may be a thin-walled tube of a transparent plastics material, e.g. acryl plastics, which is easy to clean and which, in its withdrawn state, may be readily inspected visually both on the inside and on the outside. When tube 14 is located in the mould, as shown in FIG. 4, its lower end is guided in a shallow, annular groove in the bottom member 8 of the mould, while its upper end is guided by a guide piece 15 that has the shape of a conical plug which fits into flange 5 of tube 4. Moreover, the upper end of separator tube 14 is provided with a flange 16.

A supply duct 17 (FIG. 4) for an egg-white mass extends longitudinally through guide piece 15 and, subsequent to the insertion of the separator tube and guide piece, the mould is moved to position V, FIG. 7, below a filling device (not shown) which has two discharge pipes 18 and 19 for yolk and egg-white mass, respectively. In position V pipe 18 terminates in the upper end of separator tube 14, while pipe 19 terminates in duct 17. In this station, the interior of separator tube 14 is filled with yolk mass, while the annular space between the separator tube and the web 7 of the mould is filled with egg-white mass. The two masses may, if desired, be pre-heated, for example, to 55° C so far as the egg-white is concerned, and to 65° C so far as the yolk is concerned, thus shortening the coagulation process to be effected in the machine. Prior to the filling operation the masses supplied may be subjected to some agitation in order to obtain suitably homogeneous masses and, if desired, preservatives, flavouring agents or other foodstuff components may be added to either of the masses.

After the filling operation, the mould continues to travel through a part of its circular path which, in FIG. 7, is schematically indicated by position VI, until the separator tube 14 is withdrawn. During this cycle, a first or preliminary coagulation takes place which is terminated when the yolk and the egg-white have attained a consistency such that they do not intermix after the separator tube has been withdrawn, while on the other hand they have only solidified to such an extent that after the withdrawal of the separator tube they are still able to fill the annular gap left by the tube so that they cohere in the finished product. When the separator tube has been withdrawn, the final coagulation takes place, which is completed in position VII, FIG. 7, and in the subsequent position VIII, which coincides with position III, a fresh, empty mould is introduced into the heating chamber from above, while the mould from this chamber is pushed down into the cooling chamber as described above in connection with the description of positions I–III and FIG. 2. The mould containing the finally-coagulated egg product performs a second complete revolution in the machine, this time in the cooling chamber, until, again in position III (VIII), it is pushed out of tube 4 and opened as described, whereupon the finished egg product 12 is transferred to packing machine 13.

The withdrawal of separator tube 14, as illustrated in FIG. 4, is effected by means of a fork 20 secured to the lower end of a vertically displaceable rod 21 and adapted to grip around the tube below its flange 16. The separator tube is thereby transferred to a vertical mandrel or scraping bar 22, the diameter of which corresponds to the internal diameter of the tube and which, at its upper end, is secured in a horizontal arm 23 of a spider 24, see also FIG. 1. Bar 22, at its lower end, has a circumferential groove, in which an O-ring 25 of rubber or a similar material is secured. During the withdrawal operation of the separator tube 14, ring 25 acts as a scraping means, removing any possible accumulations of yolk mass on the inside of the tube. Furthermore, after the withdrawal operation, the ring serves to retain the tube on bar 22 when fork 20 is pulled away.

Guide piece 15 has a relatively tight fit along the outside of tube 14, but is able to slide on same. Thus, to start with, during the withdrawal of the separator tube from the mould, the guide piece will remain in its place in the flange of tube 4, whereby it acts to scrape off any residual accumulations of egg-white mass from the outside of the separator tube. At its bottom end, separator tube 14 is provided with a stop, for example as shown in FIG. 5a, in the form of a small bead 14a, which holds guide piece 15 in such a way that finally it is pulled up from tube 4 together with separator tube 14, see FIG. 5.

The spider 24 is intermittently rotatable around its vertical centre line as shown in FIG. 1 and, following each withdrawal of a separator tube, the spider turns 90° so that the separator tube, in two successive steps is transferred into position IV, corresponding to FIG. 5, in which the tube is reinserted into a mould prior to the filling thereof. The introduction of the separator tube is effected by means of a fork 26 which is secured to the lower end of a vertically displaceable rod 27 and which grips around scraping bar 22 above flange 16 of the tube, see FIG. 5. Thereby, the fork pushes the separator tube downwards, and when guide piece 15 engages with the flange 5 of tube 4, the guide piece remains stationary while the separator tube continues downwards to engage with the guide groove in bottom member 8 of the mould referred to above. Following this operation, fork 26 is pulled aside and arm 23 continues with the empty scraping bar in two successive displacement steps over to the position in which it again receives a separator tube withdrawn from a filled mould.

After the finished egg product 12 has been removed from mould 6, as shown in FIG. 7, a cleaning operation of the mould may be performed, for instance, by brushing and, subsequently, a lubricating agent, such as silicone grease, may be applied to the inner wall of the mould for preventing or at least substantially reduce the tendency towards adhesion between the egg product and the mould wall, following which the mould is again placed in the holding and inserting tool 9, 10 and is introduced into a tube 4 in the heating chamber 2 of the machine.

FIGS. 8 and 8a show a modified embodiment of a resilient mould that can be employed in connection with the machine illustrated in FIGS. 1–7. Each mould, in the modified construction, comprises a cylindical web 30, which has a single, longitudinal slit which in its open, relaxes position, cf. FIG. 8a, is slightly larger than the diameter of the egg product that is to be prepared. when web 30 is completely closed so that its two longitudinal edges meet, the mould can be introduced into the above mentioned guide tube 4 of the machine. To one end of web 30, i.e., the end which faces downwards when the mould is introduced into the machine, a relatively narrow tab or tongue 32 of resilient material, e.g. the same material as that of the web, is secured along one edge 31 of the slit and tab 32 has such a curvature and length measured in the peripheral direction that when the mould is closed it extends along the inside of the web through an angle preferably slightly in excess of 180°. The tab may be secured to the web by spot welding.

Tab 32 serves to secure a detachable bottom member which is generally denoted by 33 and which comprises a tube 34, to one end of which a bottom plate 35 is secured, e.g. by welding. In the opposite end of tube 34, a top plate 36 is secured and the top plate may, on its outwards-facing surface, be covered by a glued-on disc 37 of rubber or similar material, which then forms the bottom of the mould cavity. The outer surface of tube 34 is, as shown in FIG. 8, provided with a circumferential recess which serves to accomodate the tab or tongue 32.

In lieu of the highly resilient mould shown in the drawings and having a one-piece web it would also be possible to make use of a mould the web of which is composed of two substantially semicylindrical shells each of which, at the lower end of the mould, is secured to a separate bottom plug, the two bottom plugs being located axially behind one another. The innermost bottom plug, which forms the actual bottom of the mould, may have a pin that projects xailly through an aperture in the centre of the outermost bottom plug and, after the removal of the mould, the two bottom plugs may then be rotated approximately 180° relative to each other by means of a suitable tool, whereby the mould is opened completely for the radial removal of the egg product, even if the resiliency of the two mould parts or shells is relatively low. Other modifications are also possible within the scope of the invention. Thus the machine could be constructed as a linear machine instead of a circular one and the process steps described in the foregoing can be automated to a greater or lesser extent. Dependent upon the operating sequence of the machine, spider 24 shown in FIG. 1 may be provided with a larger or smaller number of arms. Instead of the rotary spider with integral arms for picking up and transferring the separator tubes, there might also be provided one or more freely rotatable arms which, by means of a timer controlled clutch, are coupled to and uncoupled from a continuously rotating drive shaft.

In place of the rotating arms carrying vertical mandrels which guide the separator tubes when these are introduced and withdrawn, it would also be possible to utilize a single arm which is moved to and fro in a circular arc from the removal station situtated between positions VI and VII (FIG. 7) to the insertion station, that is to say position IV. The mandrel or scaping bar shown in FIGS. 4 and 5 may be constructed as a pneumatic or hydraulic cylinder, the piston of which has a piston rod projecting through the upper end of the cylinder and carrying a yoke to which two outer rods are secured that extend downwardly parallel to the cylinder. The gripping means may, in this case, be constructed in the form of a fork which engages with the flange on the topmost end of the separator tube and which is secured to the said two rods.

The means for moving mandrel 9, shown in FIG. 7, downwards may be adjustable to effect a stroke approximately twice as long as that shown and normally employed. The mandrel can then be utilized to eject a mould with contents which is present in the subjacent cooling chamber when the machine is to be emptied, i.e., when no empty mould is to be introduced into the machine.

It may be expedient to use two sets of grippers corresponding to jaws of FIG. 7, in connection with mandrel 9 for introducing the mould into the heating chamber of the apparatus. The two sets of jaws would then be mounted in such a way on a holder which can be rotated in steps of 180° around an axis parallel to the mandrel, that one set of jaws holds a mould closed coaxially or flush with the mandrel while the operator places a mould into the other set of jaws which is subsequently closed and rotated 180° after the mandrel has inserted the first mentioned mould in the machine and has then been retracted to a position in which it is clear of the first set of jaws.

The means 11 shown for holding the mould containing the finished egg product after removal from the apparatus may be coupled to an actuating mechanism that swings the mould 90° into a horizontal position and at the same time opens the mould. It is possible thereby to deposit the egg product automatically on a conveyor which carries it to a packing machine. Dependent upon the respective production rates of the production machine and the packing machine, a plurality of production machines may be mounted in line with a common conveyor and an associated packing machine.

The use of resilient material for the molds effectively solves the difficult problem created by the tendency of the product to adhere to the mold and, thereby, ensures a good surface quantity of the product. The tendency towards adhesion to the mold is increased if the mold surfaces, after the removal of the product, are not quite free of adhering, residual accumulations from a preceding coagulation process. Consequently, it is of importance that the external mold portion is removed and may be cleaned after each operation and that the internal separator tube is automatically cleaned on both sides when being withdrawn from the mold.

Figure 9:
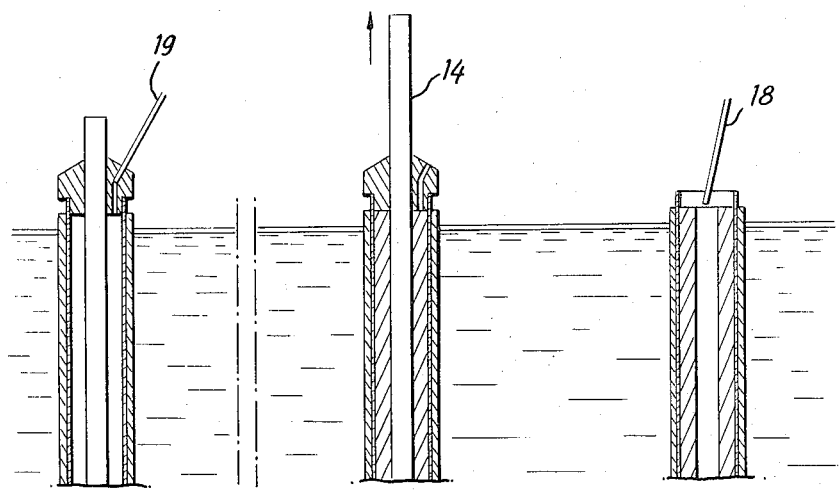
FIG. 9 shows a partial diagram of an alternate embodiment wherein the egg white and egg yolk are injected separately at different stations.

In the alternate embodiment shown in FIG. 9 the egg whitmass is first injected by itself at position V through pipe 19 into the annular space between the mold and the separator tube 14 and allowed to partially coagulate. The separator tube 14 is thereafter withdrawn at position VI to leave a central cavity or hollow core defined by the partially coagulated egg white. Following the removal of the separator tube the egg yolk mass is then injected into the central cavity through pipe 18 at position VIa. The omitted structure and its operation is identical to that shown and described in connection with the embodiment of FIGS. 1-8.

It is also contemplated that the insertion or introduction of the empty molds and the ejection of the filled molds could be performed at separate positions or stations, rather than being performed at the same position III as shown in FIG. 7.

What is claimed is:

1. Apparatus for preparing a non-packaged egg product comprising a cylindrical core of coagulated yolk mass surrounded by a shell of coagulated egg white mass, comprising:
   a heating vessel,
   means for circulating a heating fluid through said heating vessel,
   a plurality of elongated, thin-walled molds of resilient, yet rigid sheet material, each mold having at least one longitudinal slit and being open at one end,
   a bottom member located at the opposite end of each mold,
   means for closing each mold around its bottom member by a radial constriction of the mold,
   means for successively introducing said molds in said heating vessel,
   means in said vessel for maintaining the molds closed after their insertion in the vessel,
   means for inserting and centering a separator tube coaxially with and spaced from the inner wall of each mold when inserted in the vessel,
   means for supplying liquid egg white to the annular space between the separator tube and the inner wall of the mold,
   means for supplying liquid yolk to the central space formed by the separator tube,
   means for retracting said separator tube after a preliminary coagulation of at least the egg white, and means for withdrawing said molds from said heating vessel, whereby said molds open by radial extension due to their resiliency so that the finished product may be removed therefrom.

2. Apparatus as claimed in claim 1, wherein each mold comprises two substantially semi-cylindrical shells and a bottom member secured to each shell, said bottom members being located axially adjacent one another and means for effecting relative rotation of said bottom members.

3. Apparatus as claimed in claim 1, wherein the side wall of each mold is formed by integral web of resilient material having two parallel longitudinal edges which in the open, relaxed position of said mold form a longitudinal slit, which is at least as wide as the internal diameter of said web when the mold is closed.

4. Apparatus as claimed in claim 3, wherein said bottom member is detachably connected with the web by means of a resilient tongue secured to said web at one longitudinal edge thereof and extending at least partially across said slit in the open position of the mold.

5. Apparatus as claimed in claim 1, wherein said heating vessel is formed as a closed chamber having a top wall, a bottom wall and opposed side walls, said top and bottom walls having opposed and aligned pairs of apertures therein, and cylindrical wall members connecting said top and bottom walls and surrounding said apertures for enclosing closed molds inserted therein.

6. Apparatus as claimed in claim 5, wheein the means for introducing molds into the heating chamber comprises at least one pair of tongs, means for radially closing said pair of tongs around a mold, a mandrel having an outer diameter corresponding to the internal diameter of a closed mold and aligned with said apertures in an inserting station of the apparatus, and means for vertically displacing said mandrel relative to said heating chamber.

7. Apparatus as claimed in claim 5, further comprising a cooling chamber located below the heating chamber and connected thereto, said cooling chamber having a top wall, a bottom wall and side walls, and coaxially aligned pairs of apertures in said top and bottom walls aligned with the apertures in the top and bottom walls of the heating chamber.

8. Apparatus as claimed in claim 1, wherein the means for inserting and centering said separator tube comprises a pusher member adapted to engage with a flange on the upper end of said tube, means for displacing said pusher member in the longitudinal direction of the mold, an axially stationary mandrel located coaxially with the closed mold and having an outer diameter corresponding to the inner diameter of the separator tube, and an annular groove in the bottom member of each mold for receiving the lower end of the separator tube.

9. Apparatus as claimed in claim 8 further comprising a plug-like guide piece fitting with the open end of each mold and having at least one longitudinal duct for the supply of egg white mass, said guide piece being longitudinally displaceable along the outer surface of the separator tube between the flange thereof and a stop means located at the opposite end of the tube.

10. Apparatus as claimed in claim 8 comprising a scraper means located at the free end of the mandrel for engaging the inner surface of the separator tube.

11. Apparatus as claimed in claim 10 in which said scraper comprises a rubber ring received in a circumferential groove in said mandrel.

12. Apparatus as claimed in claim 8, wherein said mandrel constitutes the cylinder of a fluid ram having a piston which is mechanically connected with the pusher member for inserting the separator tube into the mold and withdrawing the tube therefrom.

13. Apparatus as claimed in claim 1, comprising means for cyclically moving each of said molds relative to a plurality of stations, said plurality of stations comprising, in succession, a station for introducing empty molds into the heating chamber from above and simultaneously ejecting molds from the bottom of the chamber, a station for inserting a separator tube in each mold, a station for supplying yolk and egg white mass and a station for withdrawing the separator tube after a preliminary coagulation of said yolk and egg white masses.

14. Apparatus as claimed in claim 1, comprising means for cyclically moving each of said molds relative to a plurality of stations, said plurality of stations comprising, in succession, a station for introducing empty molds into said vessel, a station for inserting a separator tube in each mold, a station for supplying liquid egg white mass to the annular space between a separator tube of each mold and the inner wall of such mold, a station for withdrawing said separator tube after preliminary coagulation of said egg white mass, a station for supplying liquid yolk mass to the central cavity defined by said coagulated egg white mass after withdrawal of said separator tube, and a station for ejecting filled molds from said vessel after final coagulation of said egg white and yolk masses.

15. Apparatus as claimed in claim 14 wherein the station for introducing empty molds and the station for ejecting filled molds are the same station, the filled molds being ejected by the introduction of the empty molds.

* * * * *

UNITED STATES PATENT OFFICE
CERTIFICATE OF CORRECTION

Patent No. 3,823,659          Dated July 16, 1974

Inventor(s) Vladimir Hubka et al

It is certified that error appears in the above-identified patent and that said Letters Patent are hereby corrected as shown below:

In The Heading:

The Priority Data is incorrect. Should be:

-- July 15, 1970        Danish....................3670/70--

Signed and sealed this 12th day of November 1974.

(SEAL)
Attest:

McCOY M. GIBSON JR.          C. MARSHALL DANN
Attesting Officer              Commissioner of Patents